United States Patent [19]

Maudal

[11] Patent Number: 5,311,091
[45] Date of Patent: * May 10, 1994

[54] LOW STICTION DUAL DRIVE, MOTIVE SYSTEM

[76] Inventor: Inge Maudal, 604 Lassen La., Costa Mesa, Calif. 92626

[*] Notice: The portion of the term of this patent subsequent to Sep. 10, 2008 has been disclaimed.

[21] Appl. No.: 485,053

[22] Filed: Feb. 26, 1990

[51] Int. Cl.⁵ ...................... H02K 7/075; H02P 5/52
[52] U.S. Cl. ........................................ 310/90; 310/80; 310/114; 318/48; 384/461; 384/608
[58] Field of Search ................... 74/5 R; 310/90, 114, 310/80, 83; 318/48, 85; 384/461, 608

[56] References Cited

U.S. PATENT DOCUMENTS

| | | | |
|---|---|---|---|
| 2,518,159 | 8/1950 | Martin | 384/461 |
| 2,979,367 | 4/1961 | Mims et al. | 310/90 |
| 3,034,028 | 5/1962 | Jamieson | 318/85 |
| 3,492,735 | 2/1970 | Burdick et al. | 33/321 |
| 4,749,898 | 6/1988 | Suzuki et al. | 310/80 |

FOREIGN PATENT DOCUMENTS

576073  8/1924  France ................. 384/161

Primary Examiner—Steven L. Stephan
Assistant Examiner—D. L. Rebsch
Attorney, Agent, or Firm—Leonard Tachner

[57] ABSTRACT

A dual drive motive system used to control the movement or position of another system or structure in a first and second embodiment has two motors, two frame members and a ring moveably mounted between the frame members by means of suitable bearings. One of the motors provides continuous relative motion between the ring and one of the frame members which may be secured to a foundational structure. The other motor provides relative motion between the ring and the other frame member which may be secured to a turret structure. This motion avoids the transient disturbances of lubricants. In a third embodiment, the system includes two armatures which share a common stator. In operation, the armatures and stator which are concentrically positioned rotate relative to each other and in opposite directions. In a fourth embodiment, the armatures share a common stator and the armatures are coaxially positioned. Altering the relative rotational speeds of the motors or motor components results in rotation of the system output (turret or output shaft). Although the motors or motor components and bearings are in continuous motion, the system output may be stationary or within a desired range of rotational speeds in either direction.

23 Claims, 4 Drawing Sheets

LOW STICTION DUAL DRIVE, MOTIVE SYSTEM

This application is related to now copending patent application by this applicant entitled "DC Electric Transducer" filed simultaneously with this application and hereby incorporated herein by reference.

BACKGROUND OF THE INVENTION

The invention relates generally to powered motive systems incorporating bearings such as director systems and servo control systems and more particularly to low friction and low stiction motive systems in conjunction with electric motors as power sources and incorporating bearings which support both the motors and the load.

In certain precision applications it is desirable to have a motive system output which can operate smoothly throughout its operating range in order to provide a high degree of operational predictability and accuracy. Various types of systems have been utilized which are designed to reduce friction in the bearings used in the system and thereby provide smooth, consistently accurate system operation. In this regard, it is important to note that the friction and "stiction", i.e., resistance to start up motion, of the bearing for the load support and the friction and stiction of the bearing for the driving power system are additive so that these undesired bearing effects cumulatively contribute to the overall system imperfections.

Some precision applications employ servomechanisms to accurately control the position of an output shaft. An example of such a servomechanism is disclosed in Jamieson U.S. Pat. No. 3,034,028. The Jamieson device is a position control servomechanism which has an input member which provides an electrical signal utilized to control an output member. The Jamieson invention employs frequency modulation techniques to correlate the speed, shaft position or other measurable characteristic of the input and output members. Although the Jamieson device can achieve precise control of the output member, it does not address the undesirable effects friction and stiction may have on the performance of the device. In this regard, it is well known that friction will tend to disturb the smooth operation of a servo controlled motor system, and this is particularly true of stiction, the often severe resistance to start up motion. A system with stiction often suffers from undesired motion, such as jitter, that often negates effective servo control.

In an effort to minimize friction in various types of motors (electric, turbine etc.), many designs have been devised which purportedly have reduced friction in such motors. One such design utilizes a bearing incorporating air under pressure. Although this air bearing design is very effective in reducing friction, its disadvantage is that it must be initially set into motion by other means before its low friction advantages can be fully realized. Consequently, stiction remains an important shortcoming of this design. Although magnetic suspension designs have essentially eliminated stiction, such designs are very expensive and are probably limited to fairly small systems.

In an attempt to overcome the limitations of conventional motor systems presented by their inherent stiction and friction characteristics, some prior art motor systems have incorporated preloading in order to negate the effects of these forces of friction and stiction. However, such designs tend to adversely affect the smooth operation of the motor system. In addition, compensating for the stiction and friction characteristics of a motor system makes the system inordinately complex making it more error prone as well as more likely to malfunction and break down.

Many prior art systems incorporate two motors which are simultaneously controlled. An example of such a system is disclosed in Hender U.S. Pat. No. 3,771,032. The Hender invention is basically an electric motor control system in which two motors which are interconnected electrically and mechanically are electrically controlled so that the armatures and field assemblies can rotate at different speeds in order to afford infinitely variable speed control of members driven jointly by them. Although utilization of two motors effectively allows variable speed control of the driven members, the necessity of utilizing two motors would, in many applications, increase the stiction of the system.

In many modern commercial applications, it is desirable to control the speed of the driving power system. Some prior art motor systems employ either a means of introducing resistance in the wound rotor circuit or a special control circuit to vary the speed of the driving motor. An example of such a system is disclosed in Drummond U.S. Pat. No. 2,787,747. The Drummond system incorporates a pair of similar motors in which the rotors are interconnected and in which the stators may be mechanically interconnected for opposed synchronous rotation. However, a major disadvantage of the Drummond system is that it does not address the increased friction presented by the use of two motors and does not address the increased stiction also presented by the use of two motors which may introduce undesired motor output control imprecision when the system is started.

Some prior art motor systems utilize two interconnected motors in order to provide greater (or specific) control of the motor torque output. An example of such a motor is disclosed in Carlson U.S. Pat. No. 4,373,147. The Carlson motor incorporates two motors mounted within a single housing. One member of each of the motors rotates relative to the other motor member. The first motor rotor and the second motor stator in the Carlson invention are rigidly secured together. The Carlson device is specifically adapted to measure the consistency of the material in which the output is immersed. The Carlson motor determines the consistency of the material by measurement of the reaction torque experienced by the first stator which feeds a control signal to the second stator to compensate for the reactional torque experienced by the first stator. However, the Carlson device is an accurate measuring unit only if the rotor is not moving, and very inaccurate if the rotor is moving due to the effects of back EMF, friction etc. In addition, the Carlson motor generally has the same number and type of component parts as two separate motors and does not present any savings in weight or complexity over two separate motors. Furthermore, the Carlson patent does not address the problems of friction and stiction in a servo controlled application.

A motive system incorporating bearings is thus needed that can substantially reduce the effects of bearing friction and stiction and result in a controlled system that is free from undesired jitter for enhanced output precision and consistency. A motive system incorporating bearings is also needed that can achieve reduced bearing friction and stiction while having fewer component parts for improved simplicity, reliability and efficiency.

SUMMARY OF THE INVENTION

It is a principal object of the present invention to provide an improved motive system which provides more precise control of the system output.

It is another object of the present invention to provide an improved motive system which provides more consistent system output operation.

It is also another object of the present invention to provide an improved motive system which has no stiction.

It is another object of the present invention to provide an improved motive system which has minimal frictional effects.

It is also an object of the present invention to provide an improved motive system incorporating an electric motor drive system which does not require a commutator/brush structure.

It is also an object of the present invention to provide an improved motive system in which the bearing system provides support to both the drive system and the load.

It is also an object of the present invention to provide an improved motive system having a hollow rotor shaft containing an electrical connector cable therein in order to minimize input disturbances caused by cable connections.

It is still another object of the present invention to provide an improved motive system which has relatively few component parts for efficiency of operation, simplicity of construction and reduced weight.

The motive system of the present invention is specifically designed to power two (or more) bearings so that the bearings are continuously rotating during operation of the system. The system includes a pair of drive or power means (which may, for example, be electric or hydraulic motors) which are interconnected so that the system output (preferably a rotating shaft) can be controlled by reducing or increasing the speed of rotation of either or both drive means. Thus, both the drive means and bearings are in continuous motion irrespective of output shaft rotation. Consequently, the output shaft may be initially motionless and subsequently set into motion without the system experiencing the undesirable effects of stiction. Setting the system output into motion without the effects of stiction allows more precise control of the output because its movement throughout its operating speed range is relatively smooth and virtually without speed fluctuations. Consequently, elimination of the effects of stiction allows the output movement to be more easily and consistently predictable than more conventional electric or hydraulic motor systems.

It is also an important consideration that since the bearings and the component moving parts of both drive means are rotating in opposite directions during operation of the system, frictional forces which act on the bearings and the component moving parts are generally acting in opposite directions. Consequently, when the system is set into motion, the magnitude of the frictional forces remains essentially constant.

A first embodiment incorporates a revolvable ring which is revolvable relative to both a first and a second frame member. The first embodiment also incorporates a pair of electric motors each of which drives either the inner or outer edge of the ring. One of the motors is secured to the first frame member which may be a foundational structure. Alternatively, the motor may be secured directly to a foundational structure. The other of the motors is secured to a second frame member which revolves relative to the first member and may for example be a artillery gun turret or telescope turret.

A second embodiment also incorporates a revolvable ring which is revolvable relative to both a first and a second frame member. The second embodiment incorporates a pair of electric motors which are securely mounted on the ring and rotate the first and second frame members. As with the first embodiment, the first frame member may be a foundational structure and the second frame member is revolvable relative to the first frame member and may be a telescope or gun turret.

In both the first and second embodiments, suitable bearings interconnect the ring to the first and second frame members. During operation, the motors (and bearings) rotate in opposite directions, and the bearings (and motors) are also in continuous motion. During operation, altering the relative speed of either or both motors results in movement of the turret (second frame member), as desired. Since the bearings are in continuous motion and are rotating in opposite directions, stiction is eliminated and friction is reduced.

The third embodiment essentially combines the bearing support for the motor components with the bearing support for the load. Thus, in the third embodiment the motive system bearings also support the load. The third embodiment incorporates a pair of electric motor armatures concentrically mounted within a suitable housing. The armatures share a common stator which is positioned between the armatures of the motors. The first armature is rigidly connected to the housing. The second armature is mounted within the housing and rotatable relative thereto. The stator is rotatably mounted within the housing and concentric to the first and second armature so that the stator, first armature and second armature have a common axis. A first bearing mounted between the first armature and the stator allows relative motion therebetween. A second bearing mounted between the second armature and the stator allows relative motion therebetween.

The third embodiment is preferably provided with a hollow output shaft (or rotor shaft) containing an electrical cable. The electrical cable preferably interfaces electrical motive system components with an electrical power source.

During operation of the motive system of the third embodiment, the bearings are in continuous motion and the second armature and stator are rotating in opposite directions. At a particular angular velocity of the second armature and stator, the second armature (preferably connected to an output shaft) is motionless relative to the housing (and the first armature). Increasing or reducing the relative angular velocities of the second armature or stator alters the angular velocity of the second armature relative to the first armature (housing) i.e., the output of the motor system. As with the first and second embodiments, since the bearings are in continuous motion and the component parts are rotating in opposite directions, stiction and its effects are eliminated and friction is reduced.

A fourth embodiment is similar to the third embodiment in that it incorporates two armatures coaxially mounted within a housing and a stator (or field structure) shared by the armatures. The stator is concentric to the armatures. However, the armatures are not concentric to each other but are instead in longitudinal alignment. Bearings mounted between the armatures and stator and also between the stator and housing allow relative motion between the first armature (which is secured to the housing) and the stator and also between the second armature and stator. The output shaft is also preferably hollow to contain an electrical cable therein, as with the third embodiment, in order to provide electrical energy to system components while minimizing input disturbances. In other ways the fourth embodiment is similar to the other embodiments. During operation, increasing or reducing the relative angular velocities of the second armature and stator alters the angular velocity of the second armature relative to the first armature (housing) i.e., the output of the system. As with the other embodiments, since the bearing are in continuous motion during operation of the system and the component parts are rotating in opposite directions, stiction and its effects are eliminated and friction is reduced.

The system of the present invention has important applications where the effects of stiction and friction interfere with the precision and smooth operation of various motive system outputs. It has particularly advantageous applications in servo control systems, director systems, telescopes, range finders, gun turrets and antenna systems for mobile communication systems and for space communication systems. Thus, the system of the present invention provides a motive system that has the needed characteristics of no stiction and very low friction resulting in a smoothly operating, high precision system output. The motive system of the present invention also has the needed characteristics of simple construction and easy operation to provide a control system which is inexpensive to manufacture and use and which additionally has long life and trouble free performance.

DETAILED DESCRIPTION OF THE PREFERRED EMBODIMENT

Figure 1:
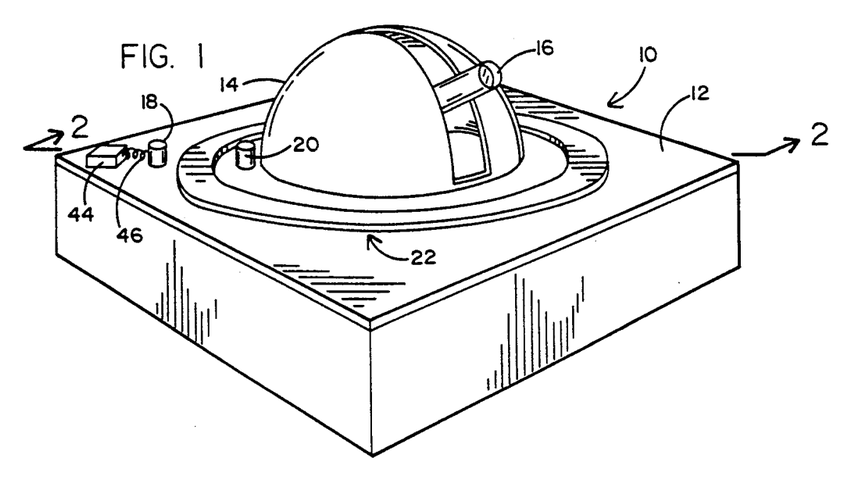
FIG. 1 is a perspective view of a first embodiment of the present invention.
Figure 2:
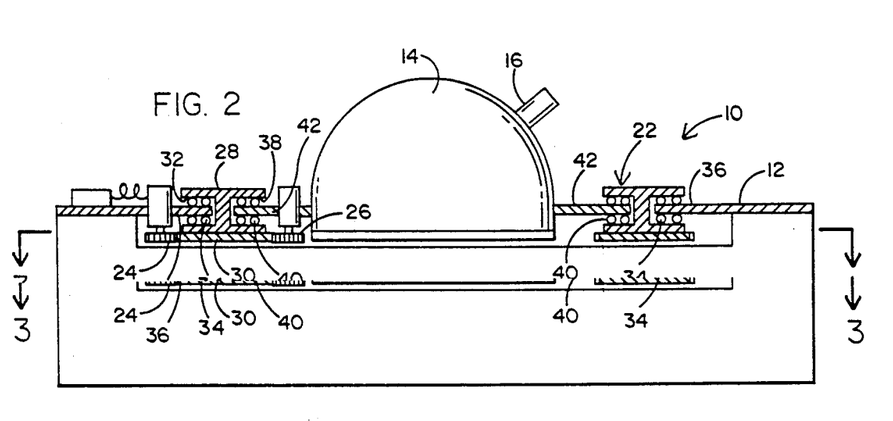
FIG. 2 is a sectional view of the embodiment of FIG. 1 taken along lines 2—2 of FIG. 1.
Figure 3:
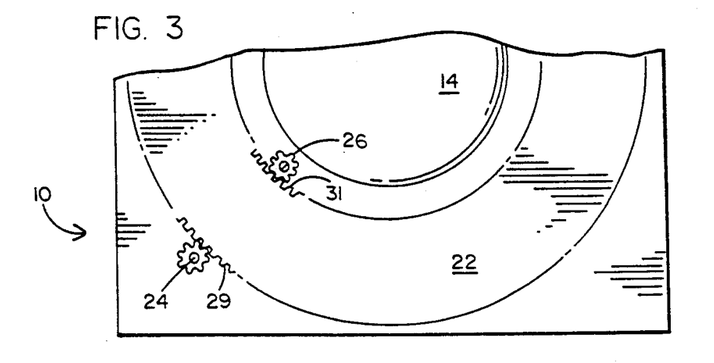
FIG. 3 is a sectional view of the embodiment of FIGS. 1 and 2 taken along lines 3—3 of FIG. 2.

Referring to the drawings, FIGS. 1, 2 and 3 show a first embodiment of the invention generally designated by the numeral 10. The particular embodiment 10 shown in FIG. 1 is a telescope system although it could also be a rotatable artillery system, rotatable antennae transmitting or receiving system for mobile or space communications or a suitable type of director system.

System 10 includes a 1st frame member 12 which is preferably a foundational member which may be securely mounted on the ground or secured to a foundational structure. System 10 also includes a 2nd frame member 14 which is preferably a turret structure in which is mounted a telescope 16 or optionally a cannon, antenna or other suitable structure. The 2nd frame member 14 is preferably rotatable relative to 1st frame member 12 to enable the telescope 16 to be pointed where desired.

A 1st drive or power means, preferably an electric motor 18, is rigidly connected to the 1st frame member 12. A 2nd drive or power means, preferably an electric motor 20, is rigidly connected to the 2nd frame member 14. Motors 18 and 20 may also be hydraulic or any other suitable type of power means. Motors 18 and 20 are preferably operably connected to revolvable member 22 so that member 22 revolves relative to the 1st and 2nd frame members. Member 22 is preferably generally in the shape of a ring and is more preferably a ring gear so that geared output shafts 24 and 26 of motors 18 and 20, respectively, can drive ring gear 22. As shown in FIG. 3, geared output shaft 24 of motor 18 is preferably connected to the outer gear teeth 29 of ring gear 22, and geared output shaft 26 of motor 20 is preferably connected to inner gear teeth 31 of ring gear 22. Thus, both motors 18 and 20 rotate in opposite directions while driving ring gear 22.

Ring gear 22 preferably includes an upper ring gear member 28 and a lower ring gear member 30. As shown in cross sectional view in FIG. 2, upper member 28 is preferably in the shape of a generally circular "I" beam structure. Outer grooved portion 32 preferably includes a first bearing 34, which is preferably a pair of bearings, as shown in FIG. 2. The 1st frame member 12 has a rim 36 which fits generally within grooved portion 32. The 1st bearing 34 provides an interface between the rim 36 of 1st frame member 12 and upper member 28 of ring gear 22 to allow 1st frame member 12 to rotate relative to ring gear 22. Inner grooved portion 38 preferably includes a 2nd bearing 40, which is preferably a pair of bearings, as shown in FIG. 2. The 2nd frame member 14 has a rim 42 which fits generally within grooved portion 38. The 2nd bearing 40 provides an interface between the rim 42 of 2nd frame member 14 and upper member 28 of ring gear 22 to allow 2nd frame member 14 to rotate relative to ring gear 22.

A control 44, preferably mounted on 1st frame member 12 and preferably an electronic control, controls motors 18 and 20 in order to vary the output speed (and other desired operating characteristics) of the motors. Control 44 may be operably connected to either or both 1st motor 18 and 2nd motor 20 by means of wires (not shown), or by a suitable wireless remote control transmitter/receiver system (not shown).

In operation, the output speeds of motors 18 and 20 may be set so that the ring gear 22 is revolving and bearings 34 and 40 are in continuous motion while 2nd member 14 is stationary relative to 1st member 12. At these particular motor output speeds, the output shafts 24 and 26 of motors 18 and 20 are rotating in opposite directions. If the output speed of either motor is increased or decreased, the 2nd member 14 will revolve relative to the 1st member 12. Thus, since the motors are continuously moving when the system is in operation irrespective of relative movement or lack of relative movement of members 12 and 14, the undesired effects of stiction are eliminated enabling the motor system 10 to revolve the member 14 from a standstill position without a jerking movement, without speed fluctuation (jitter) and with enhanced precision. In addition, since the motor outputs are rotating in opposite directions, the frictional forces acting thereon are in opposite directions. Consequently, these frictional forces are reduced thereby enabling the effects of friction on the system to also be substantially reduced thereby allowing greater precision in controlling the rotation of the 2nd member 14.

Figure 4:
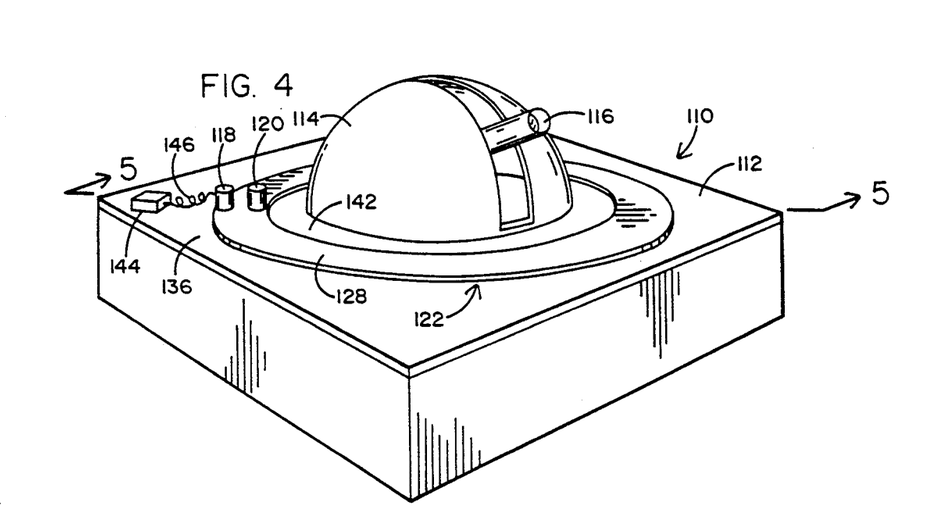
FIG. 4 is a perspective view of a second embodiment of the present invention similar to the first embodiment except that the drive means are mounted on the revolvable member rather than the frame members.
Figure 5:
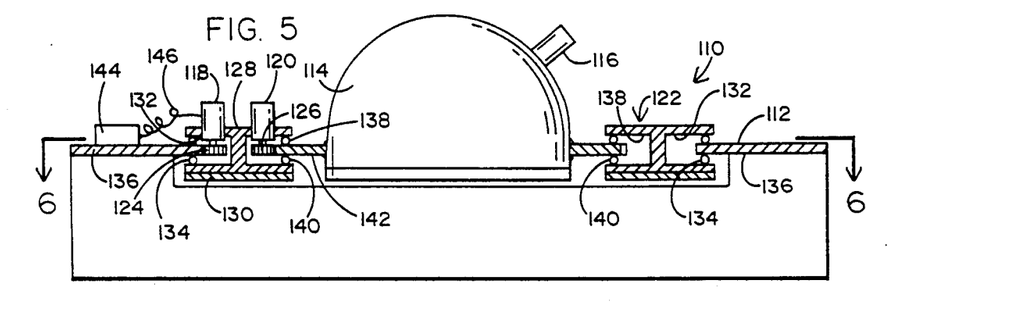
FIG. 5 is a sectional view of the embodiment of FIG. 4 taken along lines 5—5 of FIG. 4.
Figure 6:
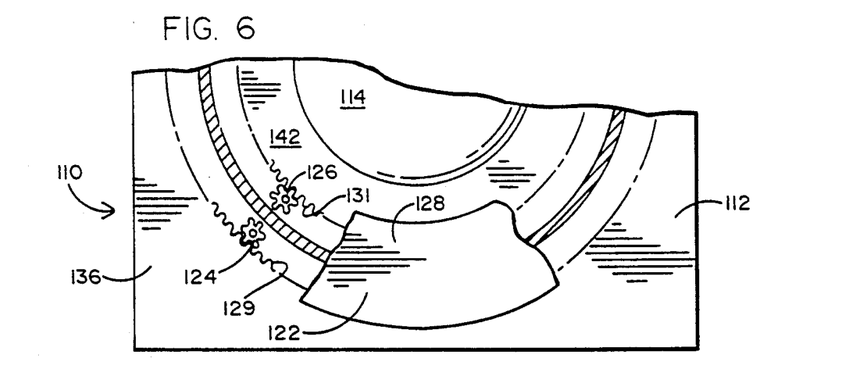
FIG. 6 is a sectional view of the embodiment of FIGS. 4 and 5 taken along lines 6—6 of FIG. 5.

FIGS. 4, 5 and 6 show a second embodiment of the present invention generally designated by the numeral 110. Embodiment 110 includes a 1st frame member 112 which is preferably a foundational member and a 2nd frame member 114 which is preferably a turret structure (on which is mounted preferably a telescope 116) and is preferably rotatable relative to the 1st frame member 112. Embodiment 110 also includes a revolvable member 122 which is preferably a ring gear. Embodiment 110 is essentially identical to embodiment 10 except that motors 118 and 120 are secured to the revolvable member 122 rather than the respective frame members as with embodiment 10. Consequently, the geared output shafts 124 and 126 of the motors 118 and 120 are operably connected to the 1st frame member 112 and 2nd frame member 114, respectively. Thus, motors 118 and 120 enable relative movement between the 1st frame member 112 and the 2nd frame member 114 as well as between the members 112 and 114 and ring gear 122. The 1st frame member 112 has gear teeth 129, and 2nd frame member has gear teeth 131 to allow the motors 118 and 120 to drive the member 114 and ring gear 122 in opposite directions.

Outer grooved portion 132 of the ring gear 122 preferably receives a 1st bearing 134, and inner grooved portion 138 of ring gear 122 preferably receives a second bearing 140. The 1st frame member 112 preferably has a rim 136 which fits generally within grooved portion 132, and 2nd frame member 114 preferably has a rim 142 which fits generally within grooved portion 138. The 1st bearing 134 provides an interface between the rim 136 of 1st frame member 112 and upper member 128 of ring gear 122 to allow the ring gear 122 to rotate relative to 1st frame member 112. The 2nd bearing 140 provides an interface between the rim 142 of 2nd frame member 114 and upper member 128 of ring gear 122 to allow 2nd frame member 114 to rotate relative to ring gear 122. Embodiment 110 also has a control 144 operably connected to motors 118 and 120. Embodiment 110 is operationally essentially identical to embodiment 10 so its operational description will not be repeated.

Figures 7, 8:
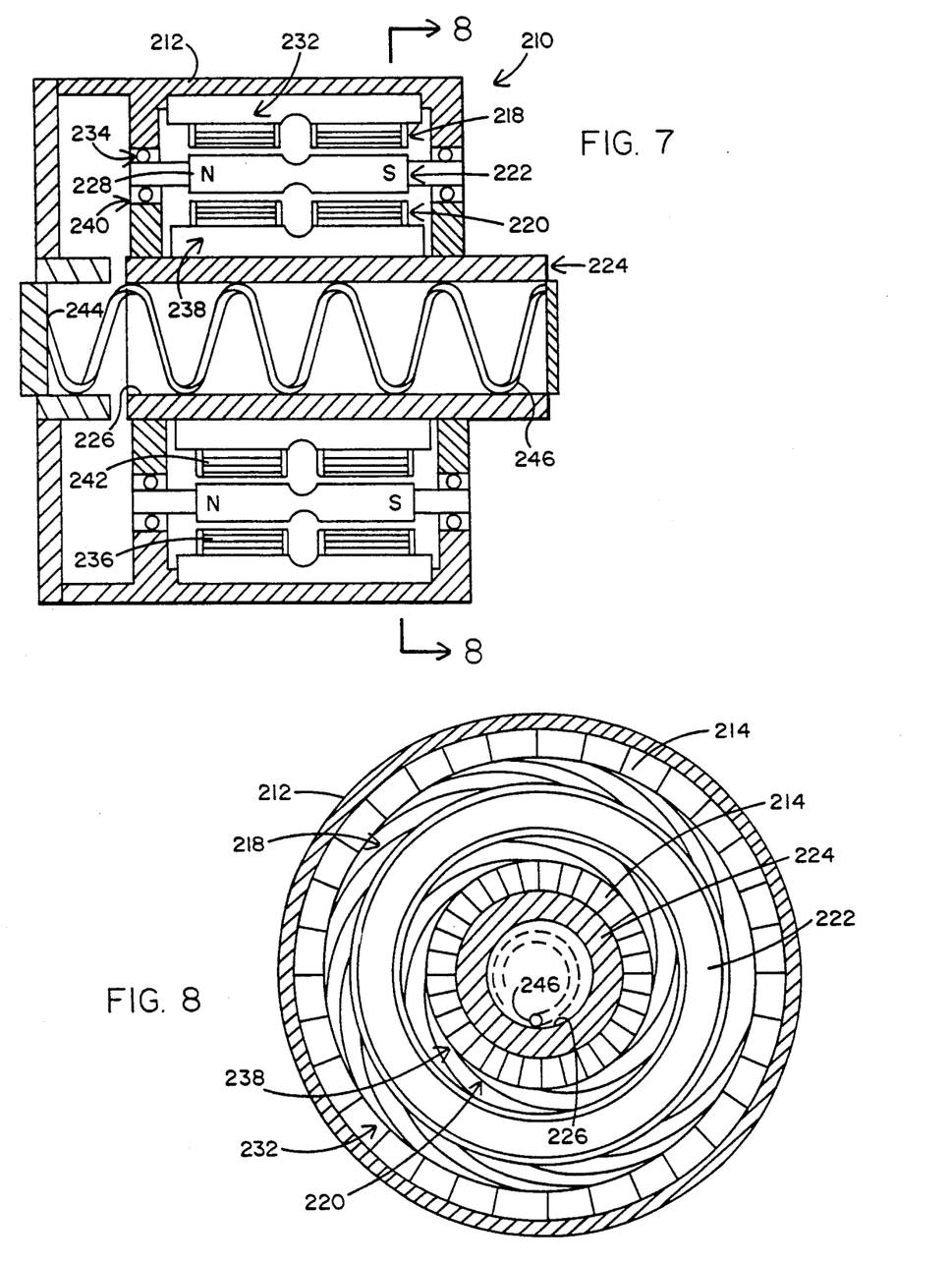
FIG. 7 is a longitudinal sectional view of a third embodiment of the present invention illustrating a hollow output shaft containing an electrical cable and showing the armatures and stator concentrically positioned.
FIG. 8 is a cross sectional view of the embodiment of FIG. 7 taken along lines 8—8 of FIG. 7.

FIGS. 7 and 8 illustrate a third embodiment of the invention generally designated by the numeral 210. Embodiment 210 includes a frame member or housing 212. A 1st armature 218 is preferably rigidly connected to the housing 212. A 2nd armature 220 is preferably rotatably mounted within the housing 212 and is preferably concentric to the 1st armature 218.

A stator or field structure 222 is also preferably rotatably mounted within the housing 212 and is preferably concentric to 1st armature 218 and 2nd armature 220. The pair of magnetic field poles 228 of stator 222 are preferably in generally longitudinal alignment with each other, as shown in FIG. 7. Outer magnetic flux return path member 232 and inner magnetic flux return path member 238 collect the magnetic flux of stator 222. Path members 232 and 238 are preferably concentric to each other. Outer path member 232 is preferably rigidly connected to 1st armature 218 (and to housing 212) and positioned so that the 1st armature is between the outer path member 232 and stator 222; inner path member 238 is preferably rigidly connected to 2nd armature 220 for rotation therewith and positioned so that the 2nd armature is between inner path member 238 and stator 222. Path members 232 and 238 preferably include a plurality of radially positioned plates 214, as shown in FIG. 8, which preferably extend generally longitudinally within the housing 212. Plates 214 are preferably laminated and separated by a suitable dielectric material for electrical insulation therebetween. Stator 222 is preferably a solid (or unitary) cylindrical magnet having only one pair of magnetic poles, as shown in FIG. 8, although it could optionally include a plurality of laterally interconnected magnets which have their pairs of magnetic poles also in generally longitudinal alignment, as set forth above. The unique stator design with its novel magnetic field pole orientation in conjunction with path members 232 and 238 allow the magnetic flux to cross the armatures 218 and 220 and extend longitudinally through path members 232 and 238 of the system 210 in contrast to conventional DC electric motors in which the magnetic flux extends through the axis of such motors (two pole configuration) or extends generally laterally to the adjacent pole (multi pole configuration).

The 1st and 2nd armatures are preferably a squirrel cage design with longitudinally disposed armature rods 236 and 242, respectively, as shown in FIG. 7. The squirrel cage design enhances the motor efficiency of the system 210.

There is preferably a 1st bearing 234 mounted between the 1st armature 218 and stator 222 to allow the 1st armature 218 to rotate relative to the stator 222. A 2nd bearing 240 is preferably mounted between the 2nd armature 220 (or suitable structures to which 2nd armature is secured, as shown in FIG. 7) and the stator 222 to allow the 2nd armature to rotate relative to the stator 222. Bearings 234 and 240 allow stator 222 to rotate relative to the 1st and 2nd armatures 218 and 220 (and also relative to the housing 212 and 2nd armature 220). Consequently, this allows the 2nd armature 220 and stator 222 to be rotating relative to each other, either in opposite directions or in the same direction and at the same or different rotational speeds. Bearings 234 and 240 also preferably provide structural support for the motor components allowing these components to support the system 210. Bearings 234 and 240 preferably have sufficient structural strength to provide support to both the motor components and the load thereby obviating the need to use independent load support bearings (which would add undesired friction to the system). Bearings 234 and 240 may instead be two pairs of bearings, as shown in FIG. 7.

The 2nd armature 220 is preferably affixed to (or integral with) output shaft 224. Output shaft 224 preferably has a hollow portion 226 which receives an electrical cable 246. Cable 246 may provide electrical power to 2nd armature 220 (as well as 1st armature 218) or it may be a general use cable used, for example, to provide electrical connection between the motor system 210 (or its support structure) and a structure forming the load (output), such as, for example, a space stable platform. Cable 246 is preferably provided with connectors 244 to facilitate connection of the cable 246 to external electrical wires or to other suitable units. One of the connectors 244 is electrically connected to a base (not shown) which is preferably secured to the housing 212, and the other of the connectors 244 is electrically connected to the load on the output shaft 224. The cable 246 is allowed to in effect "dangle" between the base and the opposite end of the output shaft 224 but is constrained within the hollow shaft 224. Therefore, transmission of torque and other forces from the base to the output shaft 224 can only occur in a rotational manner along the axis of the output shaft 224. Cable 246 is also preferably generally coiled to further minimize transmission of input disturbances therethrough. Consequently, the load is effectively isolated from the base (or housing 212) motion as well as from g-forces transmitted by the cable itself.

The 2nd armature 220 (as well as stator 222 if it is electromagnetic) may receive electrical power by means of conventional slip rings (not shown). However, other suitable electrical communication means may also be used.

In operation, the speeds of 2nd armature 220 and stator 222 may be set so that bearings 234 and 240 are in continuous motion and 2nd armature is stationary relative to 1st armature 218 (and housing 212). At these particular output speed settings, the angular velocities of 2nd armature 220 and stator 222 are approximately equal. If the output speed of either 2nd armature 218 or stator 222 is increased or reduced from these settings, output shaft 224 will rotate relative to 1st armature 218. Similarly, if the output speeds of both 2nd armature 220 and stator 222 are suitably altered from these settings, output shaft 224 will rotate relative to 1st armature 218. Thus, since 2nd armature 220 and stator 222 are rotating irrespective of relative motion (or lack of relative motion) between 1st armature 218 and 2nd armature 220, the undesired effects of stiction are eliminated enabling the output shaft 224 to be rotated from a standstill position without erratic movement, without speed fluctuation (jitter) and with enhanced precision. In addition, since the 2nd armature 220 and stator 222 are rotating in opposite directions, the frictional forces acting on the system 210 are in opposite directions. Consequently, these frictional forces are reduced thereby enabling the effects of friction on the controlled system to also be substantially reduced thereby allowing greater precision in controlling the rotational movement of output shaft 224.

Figure 9:
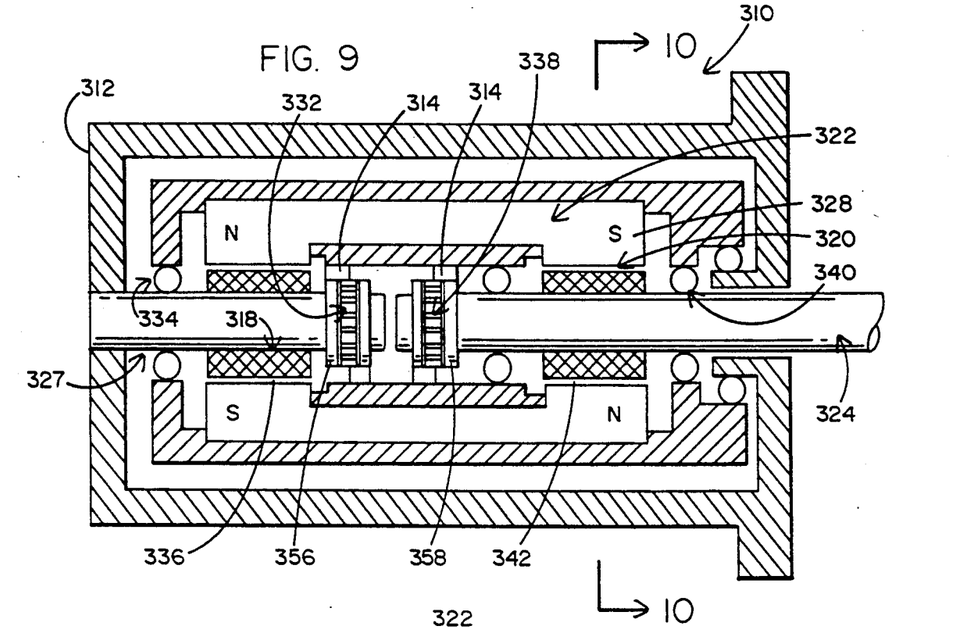
FIG. 9 is a longitudinal partial sectional view of a fourth embodiment of the present invention in which the armatures are in longitudinal alignment and share a common stator (or field structure) and showing the shafts and commutators in elevational view.
Figure 10:
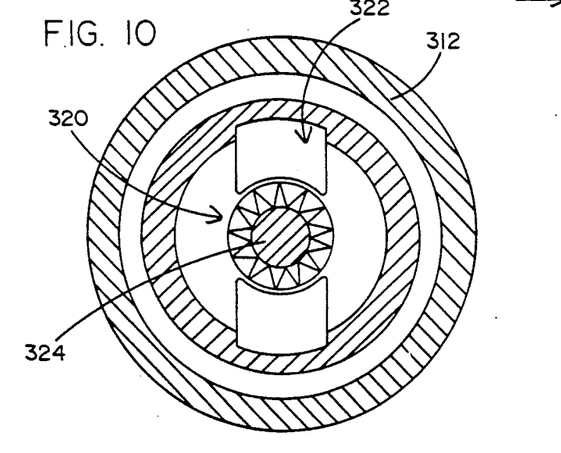
FIG. 10 is a cross sectional view of the embodiment of FIG. 9 taken along lines 10—10 of FIG. 9.
Figure 11:
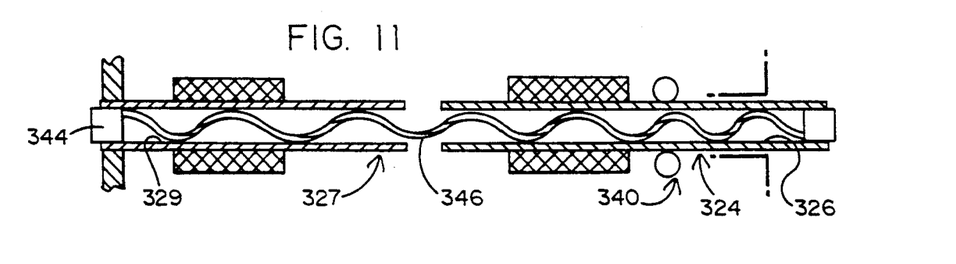
FIG. 11 is a longitudinal sectional view of the central shafts of the embodiment of FIGS. 9 and 10 showing two hollow central shafts containing an electrical cable.

FIGS. 9, 10 and 11 illustrate a fourth embodiment of the invention generally designated by the numeral 310. Embodiment 310 includes a frame member or housing 312. A 1st armature 318 is preferably rigidly connected to the housing 312. A 2nd armature 320 is preferably rotatably mounted within the housing 312 and is preferably coaxial to and in generally longitudinal alignment with 1st armature 318, as shown in FIG. 10. A stator (or field structure) 322 (preferably four pole) is also preferably rotatably mounted within the housing 312 and is preferably concentric to 1st armature 318 and 2nd armature 320. Each pair of magnetic field poles 328 of field structure 322 are preferably in generally longitudinal alignment with each other with opposing field magnets (or adjacent field magnets if more than a pair of field magnets are utilized) having their field poles in opposite orientation, as shown in FIG. 10.

The 1st armature 318 preferably has a 1st commutator 332 and slip rings 356, and the 2nd armature 320 preferably has a 2nd commutator 338 and slip rings 358. Brushes 314 in conjunction with commutators 332 and 338 and slip rings 356 and 358 provide electrical current to and also switch the direction of electrical current to armatures 318 and 320. An electrical power source (not shown) is preferably electrically connected to the housing 312 which is electrically connected to shaft 327 and slip rings 356 in order to provide electrical power to armature winding 336 of 1st armature 318.

There is preferably a 1st bearing 334 mounted between the 1st armature 318 and stator 322 to allow the stator 322 to rotate relative to the 1st armature 318. A 2nd bearing 340 is preferably mounted between the 2nd armature 320 and the stator 322 to allow the 2nd armature to rotate relative to the stator 322. Bearings 334 and 340 allow stator 322 to rotate relative to the 1st and 2nd armatures 318 and 320 (and also relative to the housing 312 and 2nd armature 320). Consequently, this allows the 2nd armature 320 and stator 322 to be rotating relative to each other, preferably in opposite directions. Bearings 334 and 340 also preferably provide structural support for the motor components allowing these components to support the system 310. Bearings 334 and 340 are preferably of sufficient structural strength to provide support to both the motor components and the load thereby obviating the need to use independent load support bearings (which would add friction to the system). Bearings 334 and 340 may instead be two pairs of bearings, as shown in FIG. 10.

The 2nd armature 320 is preferably affixed to (or integral with) output shaft 324. Output shaft 324 preferably has a hollow portion 326, and 1st armature 318 preferably has a shaft 327 preferably having a hollow portion 329. Hollow portions 326 and 329 preferably receive an electrical cable 346, as shown in FIG. 11. Cable 346 may provide electrical power to 2nd armature 320 (as well as 1st armature 318) or it may be a general use cable used, for example, to provide electrical connection between the motor system 310 (or its support structure) and a structure forming the load (output), such as, for example, a space stable platform. Cable 346 is preferably provided with connectors 344 to facilitate connection of the cable 346 to a power source (not shown), to external electrical wires or to other suitable units. Cable 346 is also preferably generally coiled to minimize transmission of input disturbances therethrough.

Stator 322 may instead also receive electrical power through brushes 314 and slip rings 356. In addition, armature 320 may alternatively receive electrical power by means of cable 346, if desired.

In operation, the motor system 310 is similar to motor system 210. The speeds of 2nd armature 320 and stator 322 may be set so that bearings 334 and 340 are in continuous motion and 2nd armature 320 is stationary relative to 1st armature 318 (and housing 312). At these particular output speed settings, the angular velocities of 2nd armature 320 and stator 322 are approximately equal. If the output speed of either 2nd armature 320 or stator 322 is increased or reduced from these settings, output shaft 324 will rotate relative to 1st armature 318. Similarly, if the output speeds of both 2nd armature 320 and stator 322 are suitably altered from these settings, output shaft 324 will rotate relative to 1st armature 318. Thus, as with embodiments 10, 110 and 210, the undesired effects of stiction are eliminated and the frictional forces acting on the system 310 are reduced. These unique features of the invention enable greater control of the rotational movement of the output shaft 324 in addition to providing smoother rotational movement of the output shaft 324.

The electrical connections of both embodiments 210 and 310 may be modified so that armature 220 and armature 320 do not receive current from an electrical power source. Preferably, in such a modification, rods 242 and windings 342 are connected to an output load or simply short circuited. As a result, armature 220 and armature 320 produce primarily an output current and provide a counter torque to stator 222 and stator 322. Controlling the current flow in the rods or windings of armatures 220 and 320 in effect produces controlled torque between stators 222 and 322 and armatures 220 and 320. Thus, components of the systems 210 and 310 function as generators which produce a controlled counter torque to act as brakes (or clutches) on the armatures 218 and 318. Having these components function as such generators is particularly advantageous in overcoming start up difficulties in systems in which the output load is a rotating system (such as an automobile drive system) and in which a rapid, high torque output is desired. Because the stators 222 and 322 will always rotate, back EMF will always be produced. The back EMF prevents excessive current at low rotational velocities which would otherwise result in overheating of the armatures.

In addition, the electrical connections of both embodiments 210 and 310 may be modified so that the output of one of the armature windings of each system is electrically connected to the input of the other armature windings of the system. With this electrical interconnection, one of the armatures (218 or 318, for example) in conjunction with the stator (field structure) acts as a motor while the other of the armatures (220 or 320, for example) in conjunction With the stator acts as a generator. Preferably, there is additional electrical power supplied to the armature acting as a motor in order to compensate for energy efficiency losses.

In addition, the field structure 222 may instead be a pair of field structures one of which is rigidly secured to the housing 212 and the other of which is rigidly secured to the output shaft 224. In this modification, there is an armature mounted between the field structures and concentric thereto. Thus, the armature is rotatable relative to the housing 212 and the output shaft 224 as well as relative to the field structures.

Accordingly, there has been provided, in accordance with the invention, a motive system which has essentially no stiction and very low friction and which is relatively simple in construction and therefore more troublefree and more inexpensive to manufacture and easier to use. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims hereinbelow.

I claim:

1. A motive system, comprising:
a first frame member;
a second frame member;
a revolvable member concentric to said first frame member and said second frame member;
a first drive means for providing relative motion between said revolvable member and said first frame member;
a second drive means for providing relative motion between said revolvable member and said second frame member;
a first bearing mounted between said revolvable member and said first frame member for allowing relative motion therebetween; and
a second bearing mounted between said revolvable member and said second frame member for allowing relative motion therebetween.

2. The system of claim 1 wherein: said first drive means is rigidly connected to said first frame member and operably connected to said revolvable member; and
said second drive means is rigidly connected to said second frame member and operably connected to said revolvable member.

3. The system of claim 2 wherein said revolvable member is a ring gear.

4. The system of claim 3 wherein said first (1st) motor has a geared output shaft for operable engagement with said ring gear.

5. The system of claim 3 wherein said second (2) motor has a geared output shaft for operable engagement with said ring gear.

6. The system of claim 1 wherein:
said first drive means is rigidly connected to said revolvable member and operably connected to said 1 st frame member; and
said 2nd drive means is rigidly connected to said revolvable member and operably connected to said 2nd frame member.

7. The system of claim 6 wherein:
said 1 st frame member has a geared portion; and
said 1 st drive means has a geared output shaft for operable engagement with said geared portion of said 1st frame member.

8. The system of claim 7 wherein:
said 2nd frame member has a geared portion; and
said 2nd drive means has a geared output shaft for operable engagement with said geared portion of said 2nd frame member.

9. The system of claim 1 further including a control operably connected to said 1st drive means and said 2nd drive means for controlling said 1 st drive means and said 2nd drive means.

10. An electrical motive system, comprising:
a housing;
a first armature mounted in said housing and rigidly secured thereto;
a 2nd armature rotatably mounted in said housing for rotational motion relative thereto, said 2nd armature having an output shaft;
a field structure rotatably mounted in said housing concentric to said first armature and said 2nd armature;

a 1st first bearing mounted in said housing for allowing relative motion between said 1 st armature and said field structure;

a 2nd bearing mounted between said 2nd armature and said field structure for allowing relative motion therebetween.

11. The system of claim 10 wherein said 1st bearing is mounted between said housing and said field structure for allowing relative motion therebetween.

12. The system of claim 10 wherein said 1st bearing is mounted between said first armature and said field structure for allowing relative motion therebetween.

13. The system of claim 10, wherein said field structure includes at least one magnetic pole pair, the magnetic poles of which are in generally longitudinal mutual alignment so that one of the poles of the pair is positioned at one longitudinal end of said field structure and the other of the poles of the pair is positioned at the other longitudinal end of said field structure.

14. The system of claim 13, wherein said field structure has a multiplicity of magnetic pole pairs, each of the pole pairs having the same magnetic orientation.

15. The system of claim 13, wherein said field structure is generally cylindrical and of unitary construction.

16. The system of claim 10 further including a magnetic flux return path member mounted within said housing and concentric to said field structure for collecting the magnetic flux of said field structure.

17. The system of claim 16 wherein said path member includes a plurality of radially positioned plates electrically insulated from each other.

18. The system of claim 16 wherein said path member is a pair of path members concentric to each other.

19. The system of claim 18 wherein one of said path members pairs is positioned so that said 1st armature is disposed between said one of said path member pairs and said field structure.

20. The system of claim 19 wherein the other of said path member pairs is positioned so that said 2nd armature is disposed between the other of said path member pairs and said field structure.

21. The system of claim 10 further including:
a first pair of brushes;
a first commutator connected to said 1st armature, said first commutator electrically connected to said first pair of brushes;
a second pair of brushes;
a second commutator connected to said 2nd armature, said second commutator electrically connected to said second pair of brushes.

22. The system of claim 10 wherein said output shaft has a hollow portion for receiving an electrical cable to transmit electrical energy to desired electrical components of the system.

23. The system of claim 22 wherein said electrical cable is generally coiled to minimize transmission of system input disturbances therethrough.

* * * * *